UNITED STATES PATENT OFFICE.

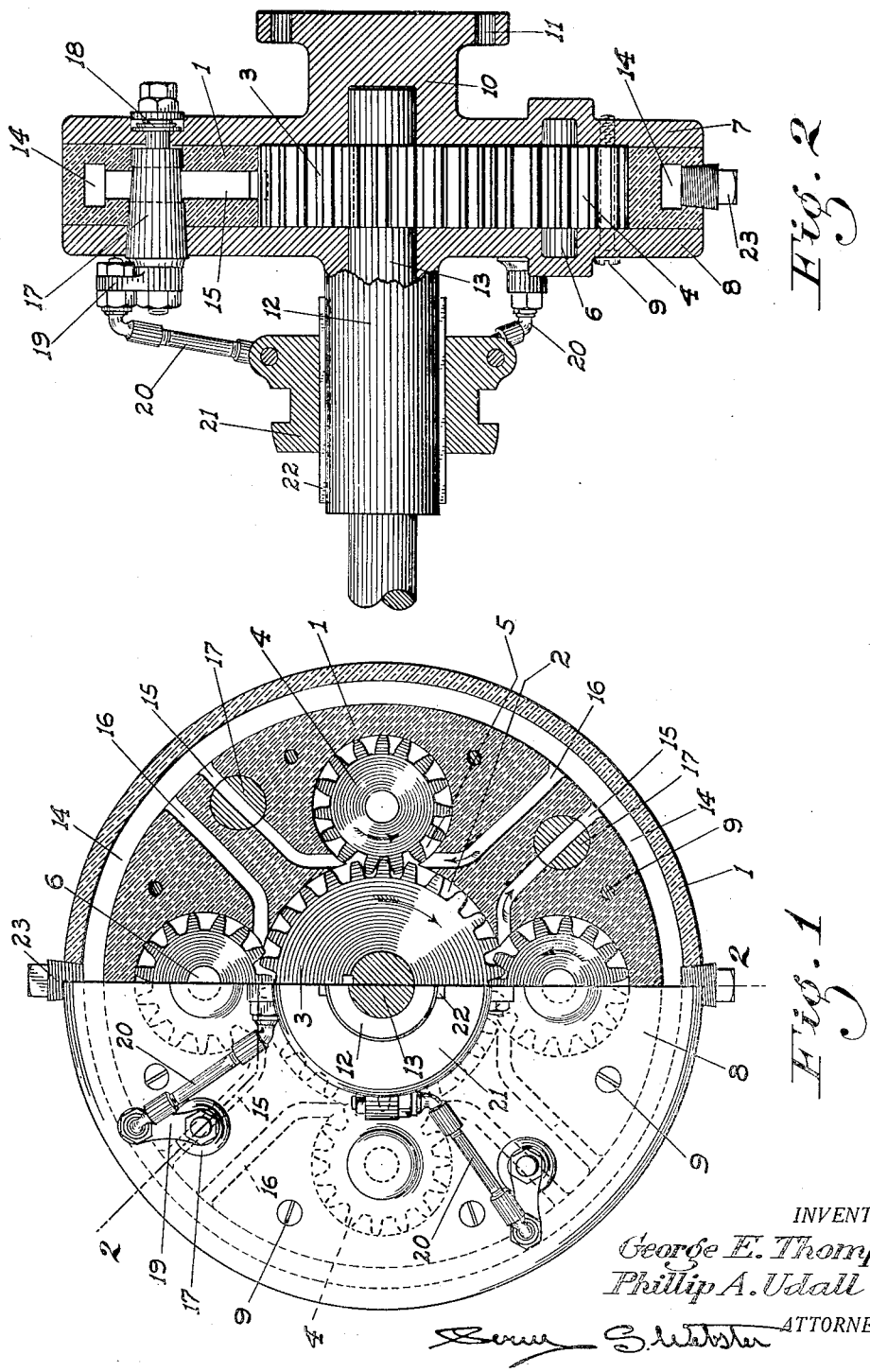

GEORGE E. THOMPSON AND PHILLIP A. UDALL, OF STOCKTON, CALIFORNIA.

FLUID-PRESSURE TRANSMISSION.

1,354,228.

Specification of Letters Patent.  Patented Sept. 28, 1920.

Application filed February 24, 1919. Serial No. 278,962.

*To all whom it may concern:*

Be it known that we, GEORGE E. THOMPSON, a citizen of the United States, residing at Stockton, in the county of San Joaquin, State of California, and PHILLIP A. UDALL, a citizen of the United States, residing at Stockton, in the county of San Joaquin, State of California, have invented certain new and useful Improvements in Fluid-Pressure Transmission; and we do declare the following to be a full, clear, and exact description of the same, reference being had to the accompanying drawings, and to the characters of reference marked thereon, which form a part of this application.

This invention relates to improvements in fluid pressure transmissions, the principal object of the invention being to provide such a transmission especially adaptable to be used in motor vehicles and the like instead of the usual clutch, and the use of which will eliminate the need of certain of the speed change gears in the usual transmission box, if not doing away with it entirely in certain cases.

Another object has been to provide a means whereby the relative speed of the drive and driven shafts may be regulated at will through our improved transmission without the use of any outside gears to do so.

As a third object, we have produced a device substantially frictionless in its operation, and one which will last indefinitely in service.

We have also produced a simple and comparatively inexpensive device, and yet one which will be extremely efficient for the purpose for which it is designed.

These objects we accomplish by means of such structure and relative arrangement of the parts as will fully appear by a perusal of the following specification and claim.

On the drawings, similar characters of reference indicate corresponding parts in the several views.

Figure 1 is an end elevation half in section of our improved fluid transmission mechanism.

Fig. 2 is a cross section thereof taken relatively on a line 2—2 of Fig. 1.

Referring now more particularly to the figures of reference on the drawings, the numeral 1 represents a gear casing, preferably of bronze or some similar metal, and being provided with a central orifice 2 therethrough. In this orifice is a gear 3, the outside diameter of which is exactly that of the orifice 2. Meshing with the gear 3 are a plurality of pinions 4, turnable in orifices 5 cut through the casing, which orifices are exactly the same diameter as the gears. The gears and pinions have a width of face exactly that of the casing 1. The pinions are mounted on pins 6 which are in turn mounted in cover plates or flanges 7 and 8, respectively, which are secured to the member 1 by means of screws or bolts 9.

The cover 7 is provided with a boss 10 projecting outwardly and centrally therefrom, on which boss is a drilled flange 11 which flange is adapted to be secured to any shaft or other part which it is desired to drive.

The cover 8 is provided with a sleeve 12 projecting outwardly and centrally therefrom, which sleeve forms the bearing for a drive or propeller shaft 13 which is keyed to the gear 3 and projects therebeyond into the boss 10 of the cover 7.

The faces of the gears, casing and covers are all finely machined to insure accurate fitting of the parts.

Inclosed in the casing 1 is a peripheral groove 14 of considerable size, from which groove leads a plurality of pairs of passages 15 and 16, each pair running to the adjacent intersections of two of the orifices 5 with the orifice 2 in the member 1, there being thus as many of such pairs of passages as there are pinions 4.

Interposed in each of the passageways 15 is a tapered valve 17, having a spiral spring 18 on its smaller end in compression and seated in the cover 7 into which the valve projects.

The other end of the valve projects through the cover plate 8 and is provided with an arm 19 at that end, which arm is connected by a ball and socket connecting rod 20 to a collar 21 slidable on splines 22 on the sleeve 12, whereby a pull on the collar along the sleeve will cause the valves to turn, the open position thereof through the passageways 15 being when the collar 21 is positioned at its closest approach to the cover 8. This collar is adapted to be shifted by a suitably positioned lever in the usual manner.

The principle of operation is as follows:

The groove 14 and passageways 15 and 16 are first filled with oil through plugs 23 in the casing 1. Castor oil is preferably used, this being a thick and viscous fluid which is excellent for the purpose on account of its physical properties.

Referring to Fig. 1, suppose the gear 3 to be turning in a clockwise direction or as indicated by the arrow. The pinions then will turn counter-clockwise, as indicated by the arrows. This will cause oil in the orifices 2 and 5 between the teeth of the gear and pinions to be squeezed out through the passageways 15 into the groove or reservoir 14, while a corresponding amount is drawn into the spaces between the teeth of the gear and pinions through the passageways 16, and so on, thus giving a free circulation of oil around the gear and pinions.

Thus, as long as the valves 17 remain open, the turning of the gear 3 will also cause the pinions 4 to turn freely likewise, merely causing a circulation of the oil through the casing as aforesaid without transmitting any motion to the covers 7 and 8.

When, however, the valves 17 are closed, which closure takes place simultaneously in all the valves owing to their connection to the collar 21 and with the sliding motion of said collar along the sleeve 12, the circulation of oil is entirely cut off, owing to the accurate and close fitting of the gear and pinions in the member 1. When this is done, it has been found that it will be absolutely impossible to rotate the pinions and therefore the turning power of the drive shaft 13 is transmitted through the pinions to the covers 7 and 8, causing the latter to rotate as a unit at the same speed as the shaft 13.

Should the valves 17 be slightly closed the circulation of oil will be obstructed but not entirely stopped. This will cause the covers 7 and 8 to turn, but slower than the shaft 13, and in proportion to the amount of opening of the valves 17.

The fact that all parts are always in an oil bath will insure the long and comparatively frictionless life thereof.

From the foregoing description it will be readily seen that we have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described our invention what we claim as new and useful and desire to secure by Letters Patent is:—

A fluid pressure transmission comprising a casing, covers thereon, a drive shaft passing into the casing, a gear secured thereon having a width exactly that of the casing, pinions meshing with the gear the same width thereas and mounted on the covers, the gear and pinions being closely and entirely surrounded by metal, a narrow peripheral fluid-filled annular passageway inclosed in the casing, and narrow passageways similarly inclosed on each side of each pinion leading from the annular passage to the points of divergence of the gear therewith, there being valves interposed in the alternate ones of the passageways which may be simultaneously turned to close the same.

In testimony whereof we affix our signatures in presence of two witnesses.

GEORGE E. THOMPSON.
PHILLIP A. UDALL.

Witnesses:
BERNARD PRIVAT,
FRANK H. CARTER.